United States Patent [19]

Grindle

[11] Patent Number: 4,790,067

[45] Date of Patent: Dec. 13, 1988

[54] CONNECTING COAXIAL CABLE TO CONNECTOR

[75] Inventor: Daniel E. Grindle, Santa Paula, Calif.

[73] Assignee: Teradyne, Inc., Boston, Mass.

[21] Appl. No.: 58,808

[22] Filed: Jun. 5, 1987

[51] Int. Cl.[4] .................................... H01R 43/02
[52] U.S. Cl. ................................ 29/748; 29/760;
29/828; 29/859; 219/229
[58] Field of Search ............. 29/748, 760, 828, 859;
439/932; 219/228, 229, 242, 535

[56] References Cited

U.S. PATENT DOCUMENTS 4,418,453 12/1983 Brown et al. ............... 29/859 X

OTHER PUBLICATIONS

Raychem Brochure for Models CV-5300 and CV-5302 Mini-Gun® Hot Air Tools, Raychem Corp., Menlo Park, CA 94025-1164.

Primary Examiner—P. W. Echols
Assistant Examiner—Taylor J. Ross

[57] ABSTRACT

Apparatus for connecting a coaxial cable to a connector having a base for connection to a conductive shield of the cable via a solder ring within a heat-shrinkable tube, the apparatus including a first fixture for engaging an end of the coaxial cable and connector and a first heater mountable in a predetermined position with respect to the fixture for directing a controlled amount of heat to the solder and heat-shrinkable tube. The apparatus also includes a second heater mounted in a predetermined position with respect to the first fixture for providing controlled heat of a different magnitude than the first heater, a second fixture for engaging another end of the coaxial cable, a third heater mounted in a predetermined position with respect to the second fixture for directing a controlled amount of heat to the region occupied by the solder ring and the heat-shrinkable tube, and a fourth heater mounted in a predetermined position with respect to the second fixture for providing controlled heat of different magnitude than that provided by the third heater. The first fixture and the first and second heaters are mounted for movement with respect to the second fixture and the third and fourth heaters, and is an electronic controller connected to control the heaters to automatically heat and test electrical integrity of the cable and connector.

15 Claims, 3 Drawing Sheets

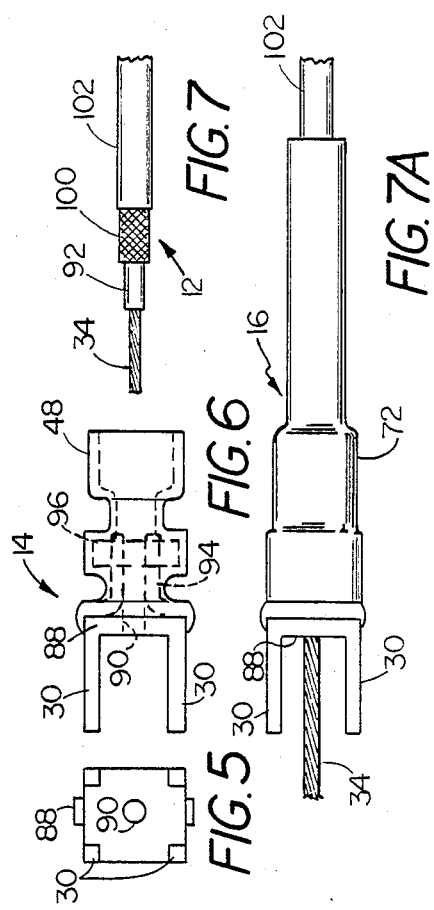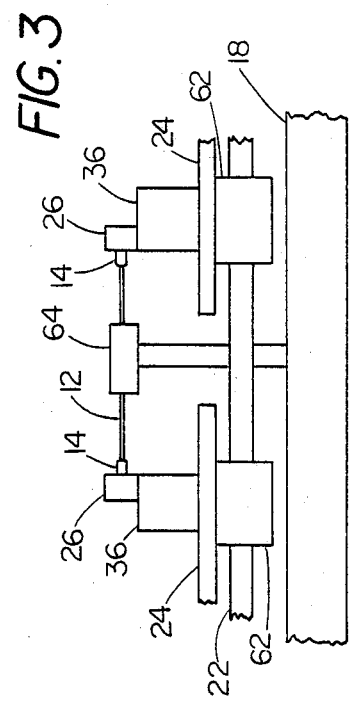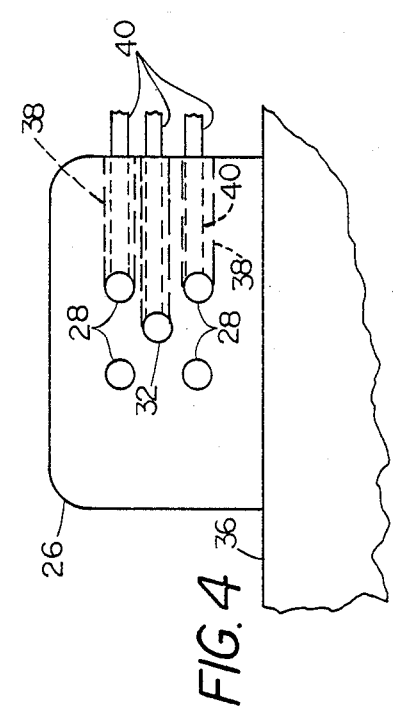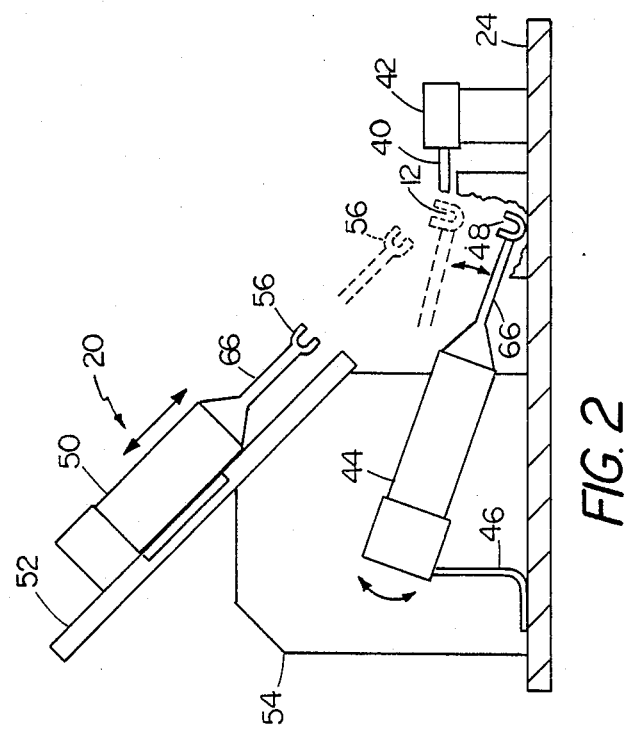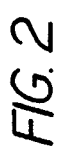

CONNECTING COAXIAL CABLE TO CONNECTOR

FIELD OF THE INVENTION

The invention relates to connecting coaxial cables to connectors.

BACKGROUND OF THE INVENTION

A coaxial cable has an inner conductor covered by a inner insulator, a circumferential conductive shield, and an outer insulator. A common coaxial connector (available under the trade designation Raychem) includes a rectangular metal base that is mounted perpendicular to the longitudinally axis of the cable, has a hole in the central area of the base through which the inner insulator and inner conductor pass, four prongs extending parallel to the cable from the four corners of the base, and a longitudinal, rearward extension from the rear of the base adjacent to the hole. A solder ring surrounding the rearward extension is used to make electrical connection between the base and the circumferential conductive shield of the wire. A heat-shrinkable plastic tube surrounds the rearward extension and solder ring. In use, the prongs are electrically connected to ground.

In attaching the connector to the coaxial cable, the cable is stripped to expose end portions of the conductive shield, the inner insulator, and the inner conductor. The inner insulator and the inner conductor are then passed through the heat-shrinkable tube, the rearward extension, and the hole in the base plate so that the exposed portion of the inner insulator extends slightly from the hole, and the exposed portion of the conductive shield is even with the solder ring. Heat is applied to cause the solder to melt, making electrical connection between the shield and the base, and to cause the heat-shrinkable tube to shrink around the melted solder. A longer, outer heat-shrinkable plastic sleeve is then slid over the heat-shrunk tube, and heat is applied again to shrink the sleeve around the heat-shrunk tube and a portion of the outer insulator. The heat is applied by an assembler holding the wire in one hand and a heater in the other. The assembled cable is tested electrically for short circuits and open circuits.

SUMMARY OF THE INVENTION

I have discovered that a coaxial cable can be quickly, easily, and reliably connected to a connector having a heat-shrinkable tube and solder ring by using a fixture to engage a connector and a stripped coaxial cable threaded in it and a heater that is mountable in a predetermined position with respect to the fixture and provides controlled, uniform heat to the region occupied by the heat-shrinkable tube and solder ring.

In preferred embodiments two ends of the cable are simultaneously connected to connectors by two sets of fixtures and heaters; a fixture and heater set is mounted for movement with respect to the other set to accommodate different lengths of wire cable; there are two heaters for each end of a cable being connected to a connector, one for providing heat to melt the solder and shrink the heat-shrinkable tube, and one providing a different amount of heat for shrinking an outer heat-shrinkable sleeve; the connector has a plurality of prongs, and the fixture includes electrical contacts to make electrical connection to the inner conductor and prongs, to provide testing of electrical integrity during the manufacture procedure; and the wires are tested and heated under the automatic control of an electronic controller.

Other features and advantages of the invention will be apparent from the following description of a preferred embodiment thereof and from the claims.

DESCRIPTION OF THE PREFERRED EMBODIMENT

The preferred embodiment will now be described.

DRAWINGS

FIG. 2 is a diagrammatic, partial, side elevation of a sliding heater and fixture assembly of the FIG. 1 apparatus.

FIG. 3 is a partial front elevation of a central portion of the FIG. 1 apparatus.

FIG. 4 is a partial elevation of a fixture of the FIG. 1 apparatus.

FIG. 5 is a front elevation of a connector connected in the FIG. 1 apparatus.

FIG. 6 is a side elevation of the FIG. 5 connector.

FIG. 7 is a partial elevation of an end of a stripped coaxial cable for connection to the FIGS. 5, 6 connector using the FIG. 1 apparatus.

FIG. 7A is a partial elevation of a terminated cable according to the invention.

Structure

Figure 1:
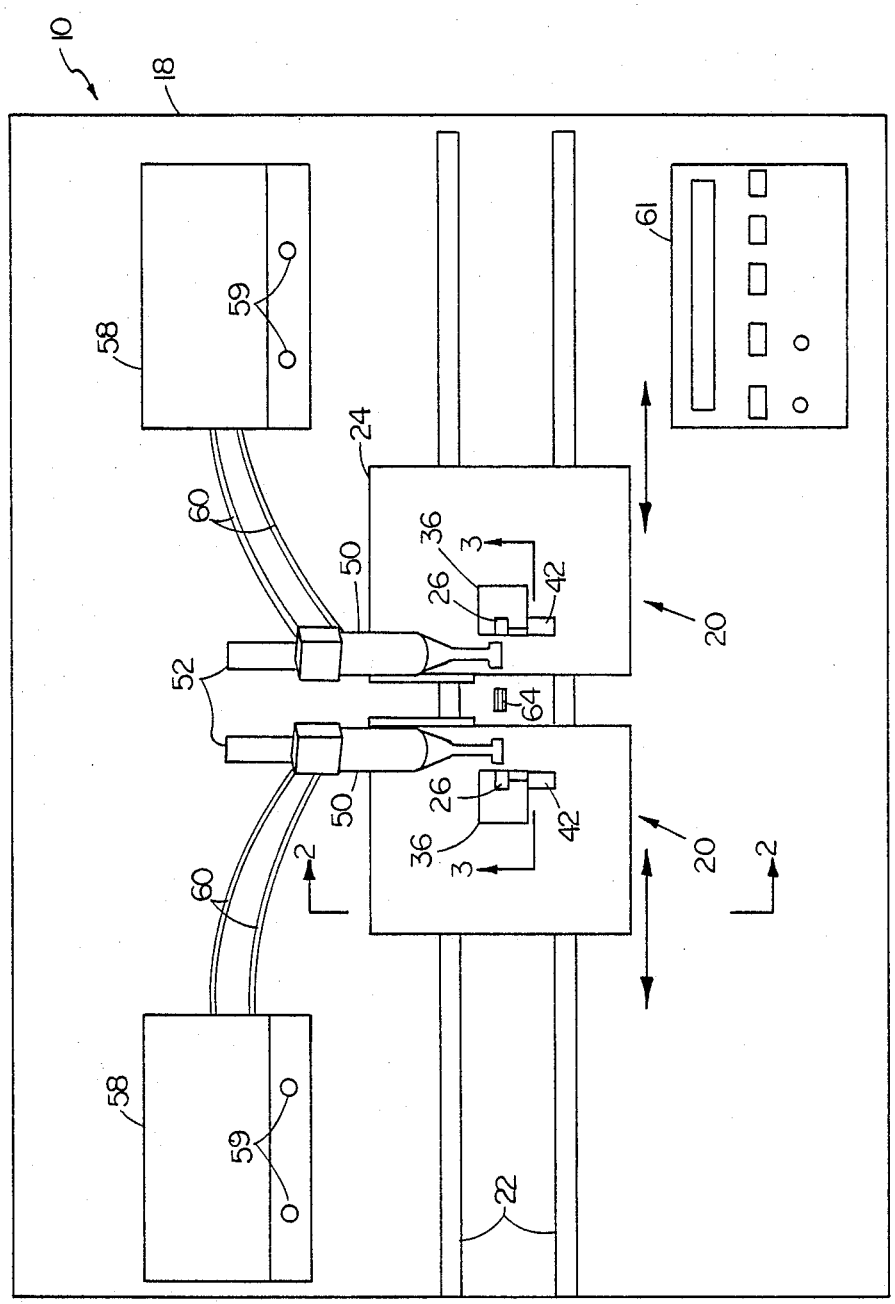
FIG. 1 is a diagrammatic plan view of apparatus for connecting a coaxial cable to a connector according to the invention.

Referring to the drawings, there is shown apparatus 10 (FIG. 1) for connecting coaxial cable 12 (FIG. 7) to connector 14 (FIGS. 5, 6) to provide terminated cable 16 (FIG. 7A). Apparatus 10 includes metal base 18 on which two heating units 20 are slidably mounted on tracks 22 to simultaneously heat two ends of cable 12 (which can have a length between 3" and 36") supported between them. Referring to FIGS. 1-4, each heating unit 20 includes support plate 24 on which is mounted fixture 26 having holes 28 for receiving prongs 30 of connector 14 and center hole 32 for receiving inner conductor 34 of cable 12. Fixture 26 is supported on 2"×2"×2" Delrin block 36 supported on plate 24. Fixture 26 also has transverse holes 38 receiving contacts 40 that are movable into contact with prongs 30 and wire 34 in holes 28, 32 by solenoid 42.

Lower heater 44 is pivotally mounted for 30° movement on bracket 46 by pneumatic control means (not shown) to bring its tip 48 to the activated position shown in phantom in FIG. 2. Upper heater 50 is slidably mounted on track 52, secured to plate 24 by bracket 54. Heater 50 is slidable from the rest position shown in solid in FIG. 2 to an activated position in which its tip 56 is extended to a position that slightly lower that the position shown in phantom in FIG. 2. Heaters 44, 50 are electric heaters having adjustable heat and air flow rate so as to control the heat provided to wire 12 and connector 14 at their respective tips 48, 56. Heaters 44, 50 are controlled by control units 58, that have adjustment knobs 59 and are connected to the heaters by wires 60. A microprocessor-based controller behind control panel 61 provides control of the overall operation of heaters 44, 50 and the electrical tests performed on cable 12 and connectors 14.

Referring to FIG. 3, plates 24 are mounted for sliding on tracks 22 via bearing mechanisms 62. At the center of support plate 18 is trough 64 for supporting the middle portion of cable 12 to prevent it from sagging.

Figure 9:
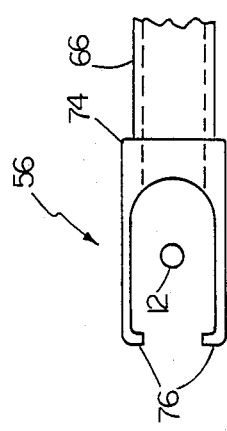
FIG. 9 is partial side view of the FIG. 8 tip with a cable shown in position therein.
Figure 8:
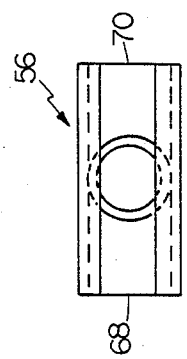
FIG. 8 is an end view of a tip of a heater of the FIG. 1 apparatus.

Referring to FIGS. 8 and 9, tip 56 is mounted on supply tube 66 of heater 50. Tip 56 is approximately 1.250" wide from end 68 to end 70 (to direct heat to outer sleeve 72, FIG. 7A, along its 1.250" length), 0.625" high and 1" long from base 74 to outer, facing curved lips 76. Lips 76 are spaced from each other by 0.350" at their ends and cause the heat to wrap around wire 12 and connector 14 (not shown in FIG. 9) therein to facilitate uniform heating.

Figure 11:
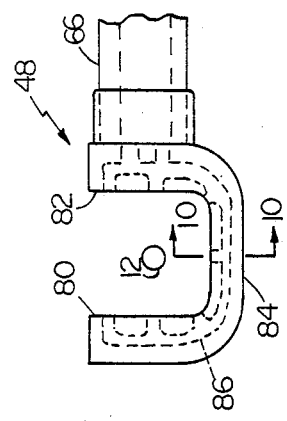
FIG. 11 is a side elevation of the FIG. 10 tip with a coaxial cable shown in position therein.
Figure 10:
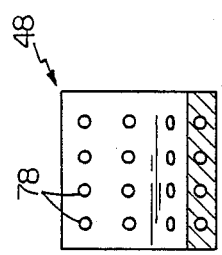
FIG. 10 is a sectional view of a tip of another heater of the FIG. 1 apparatus.

Referring to FIGS. 10, 11, tip 48 has U-shaped cross section and has a plurality of apertures 78 that are distributed along legs 80, 82 and curved base 84 and are fed by channels 86 in order to uniformly distribute heat to wire 12 and connector 14 (not shown in FIG. 11) placed within tip 48.

Referring to FIGS. 5, 6, 7, 7A, connector 14 includes rectangular base 88, which is mounted perpendicular to the longitudinal axis of cable 12, has four prongs 30 extending parallel to the cable from the corners of base 88, has hole 90 in the central area of base 88 through which first inner insulator 92 of cable 12 and inner conductor 34 pass and has longitudinal rearward extension 94. Solder ring 96 surrounds rearward extension 94 and is itself surrounded by heat-shrinkable plastic tube 48. Cable 12 includes inner conductor 34, inner insulator 92, circumferential conductive shield 100 and outer insulator 102. In terminated cable 16, outer heat-shrinkable sleeve 72 surrounds portions of connector 14 extending rearwardly from base 88.

Operation

In operation, plates 24 are moved along tracks 22 to provide the spacing between their fixtures 26 for the lengths of cables 12 being connected to connectors 14. Cables 12 are stripped on both ends by a Eubanks stripping device to provide exposed end portions of conductive shield 100, inner insulator 92 and inner conductor 34, as shown in FIG. 7. Two sleeves 72 are slipped onto cable 12 and moved to a central portion, and the exposed portions of inner conductor 34 and inner insulator 92 are passed through plastic tube 48 and hole 90 of connector 30 so that the exposed portion of inner insulator 92 extends slightly from hole 90, and the exposed portion of conductive shield 100 is even with solder ring 96. Prongs 30 and inner conductors 34 are inserted into holes 28, 32 of fixtures 26.

The operator pushes a button on control panel 61, causing solenoid 42 to advance contacts 40 to contact two prongs 30 and center conductor 34 and to conduct tests to see if there is a short circuit between inner conductor 34 and prongs 30 or an open circuit between two ends 34 or between the prongs 30 on the two connectors 14. If the tests do not indicate any failures, heater 44 is automatically rotated 30° to move tip 48 into the position shown in phantom on FIG. 2, and controlled heat is uniformly applied around heat-shrinkable tube 48, causing solder ring 96 to melt and flow and cause electrical contact between rearward extension 94 and exposed conductor shield 100. The heat also causes tube 48 to shrink. Contacts 40 are advanced again, and there are further tests for opens and shorts. Heaters 44 are automatically rotated to the standby position, and control panel 61 indicates to the operator that the first heating has been successful, and it is time to prepare for the second heating. The operator slides sleeves 72 from their central positions to the position shown in FIG. 7A, and slides heaters 50 along tracks 52 so that tips 56 surround outer sleeve 72. The operator pushes a button on control panel 61, and heaters 50 provide uniform, controlled heat to heat-shrinkable sleeve 72 along its length, causing it to shrink around connector 14 and portions of adjacent cable 12 and to assume the shape shown in FIG. 7A.

Apparatus 10 greatly reduces the time to connect connectors 14 to cables 12 and to test them, and provides uniform heat, thereby standardizing the quality of terminated connector 16.

OTHER EMBODIMENTS

Other embodiments of the invention are within the scope of the following claims.

What is claimed is:

1. Apparatus for connecting a coaxial cable to a first connector having a metal base for connection to a conductive shield of said cable via a solder ring within a heat-shrinkable tube, said apparatus comprising
   a first fixture for engaging an end of said coaxial cable and first connector,
   a first heater mounted in a predetermined position with respect to said fixture for directing a controlled amount of heat to said solder and heat-shrinkable tube, and
   a second heater mounted in a predetermined position with respect to said fixture for providing controlled heat of different magnitude than that provided by said first heater to a heat-shrinkable sleeve provided over the heat-shrinkable tube and extending therebeyond along said cable.

2. The apparatus of claim 1 further comprising
   a second fixture for engaging another end of said cable and second connector and a third heater mounted in a predetermined position with respect to said second fixture for directing a controlled amount of heat to the region occupied by said solder ring and heat-shrinkable tube and
   a fourth heater mounted in a predetermined position with respect to said second fixture for providing controlled heat of different magnitude than that provided by said third heater to a heat-shrinkable sleeve provided over the heat-shrinkable tube and extending therebeyond along said cable.

3. The apparatus of claim 2 wherein said first fixture and first and second heaters are mounted for movement with respect to said second fixture and third and fourth heaters to accommodate different lengths of cable.

4. The apparatus of claim 3 wherein said first fixture and first and second heaters are mounted on a first plate that is slidably mounted on tracks, and said second fixture and third and fourth heaters are mounted on a second plate that is slidably mounted on said tracks.

5. The apparatus of claim 4 further comprising a trough between said plates for supporting the middle of said cable.

6. The apparatus of claim 1 wherein said first heater has a tip and is automatically movable into position with said tip around said cable when said cable is in said fixture.

7. The apparatus of claim 1 wherein said first heater includes means to produce heated air and has a tip with a plurality of apertures for uniformly distributing said heated air.

8. The apparatus of claim 1 wherein said second heater includes means to produce heated air and has a tip with an open area and opposing lips to wrap heat around a cable therein.

9. The apparatus of claim 1 wherein said first and second heaters are each mounted for alternate movement between a standby position spaced from said predetermined position and said predetermined position.

10. The apparatus of claim 1 wherein said fixture includes contacts for making electrical contact to said base and to said inner conductor, and a tester to test the electrical integrity of said cable.

11. The apparatus of claim 10 further comprising an electronic controller connected to control said heaters and tester to automatically heat and test electrical integrity of said cable and connector.

12. Apparatus for connecting a coaxial cable to a connector having a metal base for connection to a conductive shield of said cable via a solder ring within a heat-shrinkable tube, said apparatus comprising a first fixture for engaging an end of said coaxial cable and first connector, said fixture including contacts for making electrical contact to said base and to said inner conductor, a first heater mounted in a predetermined position with respect to said fixture for directing a controlled amount of heat to said solder and heat-shrinkable tube, and a tester to test the electrical integrity of said cable.

13. The apparatus of claim 12 further comprising an electronic controller connected to control said first heater to automatically heat and test electrical integrity of said cable and connector.

14. Apparatus for connecting a coaxial cable to a connector having a metal base for connection to a conductive shield of said cable via a solder ring within a heat-shrinkable tube, said apparatus comprising a first fixture for engaging an end of said coaxial cable and first connector, a first heater mounted in a predetermined position with respect to said fixture for directing a controlled amount of heat to said solder and heat-shrinkable tube, a second fixture for engaging another end of said cable and second connector, and a second heater mounted in a predetermined position with respect to said second fixture for directing a controlled amount of heat to the region occupied by said solder ring and heat-shrinkable tube, said first fixture and first heater being mounted for movement with respect to said second fixture and second heater to accommodate different lengths of cable, said first fixture and first heater being mounted on a first plate that is slidably mounted on tracks, said second fixture and second heater being mounted on a second plate that is slidably mounted on said tracks.

15. The apparatus of claim 14 further comprising a trough between said plates for supporting the middle of said cable.

* * * * *